(12) United States Patent
Jafari et al.

(10) Patent No.: US 8,379,083 B1
(45) Date of Patent: Feb. 19, 2013

(54) SIMULTANEOUS VIEWING AND RELIABLE RECORDING OF MULTIMEDIA CONTENT OVER A NETWORK

(75) Inventors: Reza Jafari, Overland Park, KS (US); Hung Viet Bui, Chantilly, VA (US); Shingara Singh Dhanoa, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1251 days.

(21) Appl. No.: 12/174,795

(22) Filed: Jul. 17, 2008

(51) Int. Cl.
*H04N 7/18* (2006.01)

(52) U.S. Cl. ......... 348/143; 709/230; 709/231; 348/125

(58) Field of Classification Search .................. 348/143; 709/230, 231
See application file for complete search history.

(56) References Cited

U.S. PATENT DOCUMENTS

| | | | | |
|---|---|---|---|---|
| 5,680,322 | A | | 10/1997 | Shinoda |
| 6,247,150 | B1 | * | 6/2001 | Niemela ........................ 714/701 |
| 6,275,471 | B1 | * | 8/2001 | Bushmitch et al. ........... 370/248 |
| 6,289,054 | B1 | | 9/2001 | Rhee |
| 6,651,103 | B1 | * | 11/2003 | Markowitz et al. ........... 709/231 |
| 6,741,554 | B2 | * | 5/2004 | D'Amico et al. ............. 370/225 |
| 7,117,521 | B2 | * | 10/2006 | Puthiyedath .................. 725/107 |
| 7,421,508 | B2 | * | 9/2008 | Hannuksela et al. ......... 709/231 |
| 8,001,261 | B2 | * | 8/2011 | Katis et al. .................... 709/231 |
| 8,102,801 | B2 | * | 1/2012 | Kwak ............................ 370/328 |
| 2003/0101274 | A1 | * | 5/2003 | Yi et al. ......................... 709/232 |
| 2004/0010595 | A1 | * | 1/2004 | Hiranaka ....................... 709/227 |
| 2005/0169199 | A1 | * | 8/2005 | Futenma et al. .............. 370/282 |
| 2005/0180415 | A1 | * | 8/2005 | Cheung et al. ................ 370/389 |
| 2005/0186975 | A1 | * | 8/2005 | Yach et al. .................... 455/466 |
| 2006/0140591 | A1 | * | 6/2006 | Estevez et al. ................ 386/105 |
| 2006/0288391 | A1 | * | 12/2006 | Puthiyedath .................... 725/89 |
| 2008/0062990 | A1 | * | 3/2008 | Oran .............................. 370/392 |
| 2008/0225850 | A1 | * | 9/2008 | Oran et al. .................... 370/392 |
| 2009/0247168 | A1 | * | 10/2009 | Morimoto et al. ............ 455/437 |

* cited by examiner

*Primary Examiner* — John Follansbee
*Assistant Examiner* — Anthony Mejia

(57) ABSTRACT

A video surveillance system has an encoder receiving a video signal from a camera and generating real-time sequenced packets for streaming to a remote monitoring location. A transmit buffer is coupled to the encoder for buffering the sequenced packets. A transmit controller transmits an original packet stream comprising the sequenced packets. The transmit controller is responsive to retransmission requests to transmit sequenced packets from the transmit buffer as a retransmission stream. A receive controller is provided at the monitoring location for receiving the original packet stream and detecting missing packets from the original packet stream to transmit corresponding retransmission requests to the transmit controller for the missing packets. A decoder is responsive to the original packet stream to generate a reproduced video signal for viewing at the monitoring location. A recorder stores recorded video responsive to the original packet stream and the retransmission stream. The retransmission stream includes sequenced packets that are received too late to be used by the decoder for live reproduction, so that the recorded video provides a higher quality reproduced video signal than the reproduced video signal viewed in real-time at the monitoring location.

13 Claims, 4 Drawing Sheets

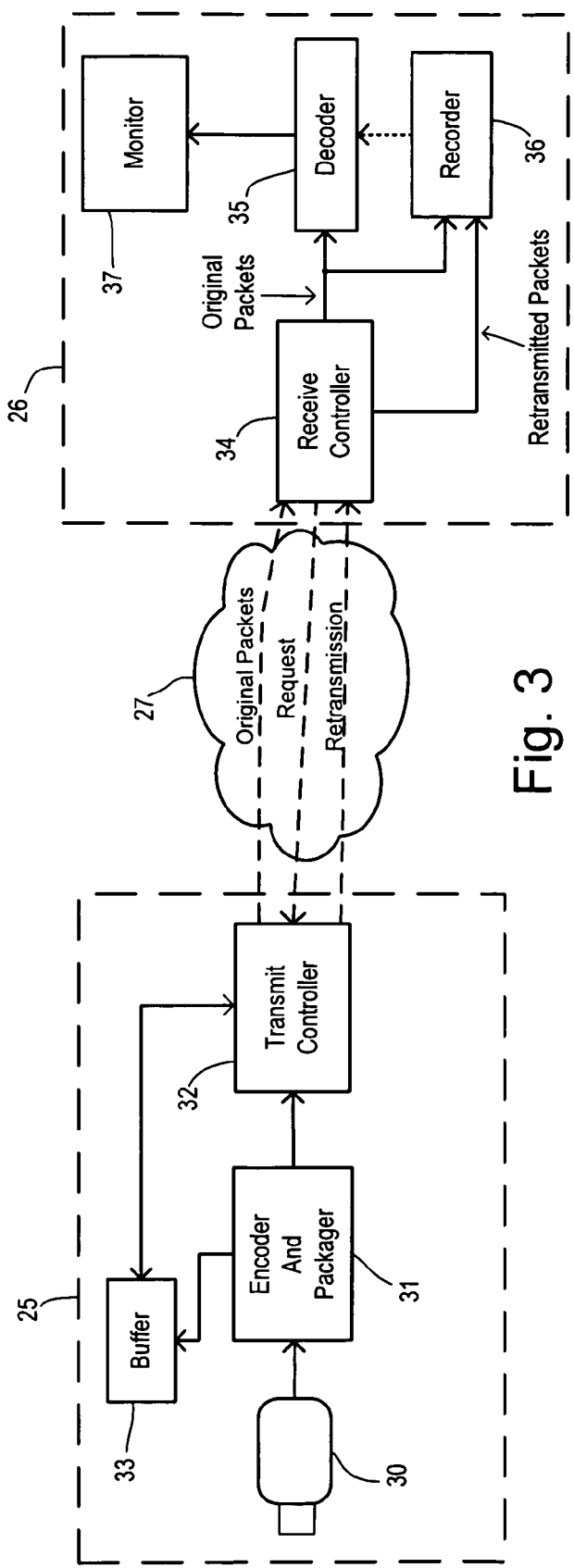
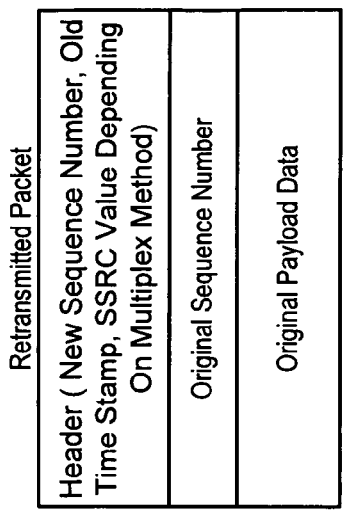
Fig. 5
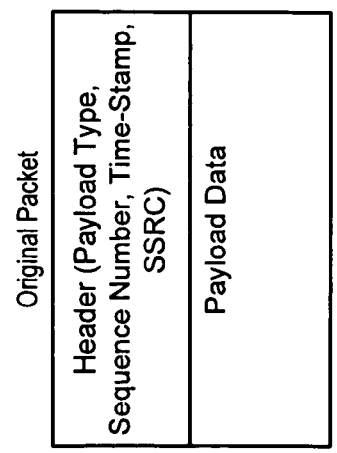
Fig. 4

SIMULTANEOUS VIEWING AND RELIABLE RECORDING OF MULTIMEDIA CONTENT OVER A NETWORK

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to video surveillance systems, and, more specifically, to streaming video content over a wireless network using a transmission protocol that does not guarantee delivery of data while ensuring availability of a high quality video signal at the remote site.

Multimedia streaming applications over packet-based networks often use real-time protocol (RTP) to transmit the multimedia content. RTP utilizes the user datagram protocol (UDP) as its transport layer protocol. UDP is not a reliable transport protocol (i.e., delivery of any particular packet within a stream is not guaranteed).

In order to reduce bandwidth requirements, multimedia content is typically compressed before it is transmitted over IP networks. Compressed video streaming over wireless networks (such as EVDO, WiMAX, or LTE) is subject to transmission errors that can result in lost or corrupted RTP packets in the data stream, potentially degrading the quality of the multimedia content reproduced at the receiving end. Because of compression, severe loss of quality can result even in the case of moderately low video frame losses, for example.

For some video streaming applications such as social networking or video chatting, the potentially degraded video quality may be acceptable. However, other applications such as video surveillance for safety monitoring and law enforcement purposes rely on the ability to accurately record and reproduce the video signal captured by a camera at the surveillance location. Even occasional degradation of the video quality may not be acceptable, especially when the video is used for conducting investigations.

SUMMARY OF THE INVENTION

The present invention has the advantage of maintaining a high quality recorded video signal without affecting the display of live video content (which stays in real time, but which may exhibit degraded quality). The invention duplicates the live media stream for display and for recording. The receiver requests retransmission of lost packets to supplement the recorded video. However, the retransmitted content is ignored in the live display process. Thus, retransmission requests can continue to be initiated and responded to even after they would no longer be useful in restoring the quality of the live display.

In one aspect of the invention, a video surveillance system has a camera generating a video signal at a surveillance location. An encoder receives the video signal and generates real-time sequenced packets corresponding to the video signal. A transmit buffer is coupled to the encoder for buffering the sequenced packets. A transmit controller is coupled to the encoder and the transmit buffer, wherein the transmit controller transmits an original packet stream comprising the sequenced packets, and wherein the transmit controller is responsive to retransmission requests to transmit sequenced packets from the transmit buffer as a retransmission stream. A receive controller is provided at a monitoring location for receiving the original packet stream, wherein the receive controller detects missing packets from the original packet stream and transmits corresponding retransmission requests to the transmit controller for the missing packets. A packet-based network couples the transmit and receive controllers. A decoder is responsive to the original packet stream to generate a reproduced video signal for viewing at the monitoring location. A recorder stores recorded video responsive to the original packet stream and the retransmission stream. The retransmission stream includes sequenced packets that are received too late to be used by the decoder for live reproduction, so that the recorded video provides a higher quality reproduced video signal than the reproduced video signal viewed in real-time at the monitoring location.

BRIEF DESCRIPTION OF THE DRAWINGS

FIG. 3 is a block diagram showing an embodiment of a video surveillance system according to the present invention.

FIG. 4 shows contents of a packet within an original stream.

FIG. 5 shows contents of a retransmitted packet within a retransmitted stream.

DETAILED DESCRIPTION OF PREFERRED EMBODIMENTS

Figure 1:
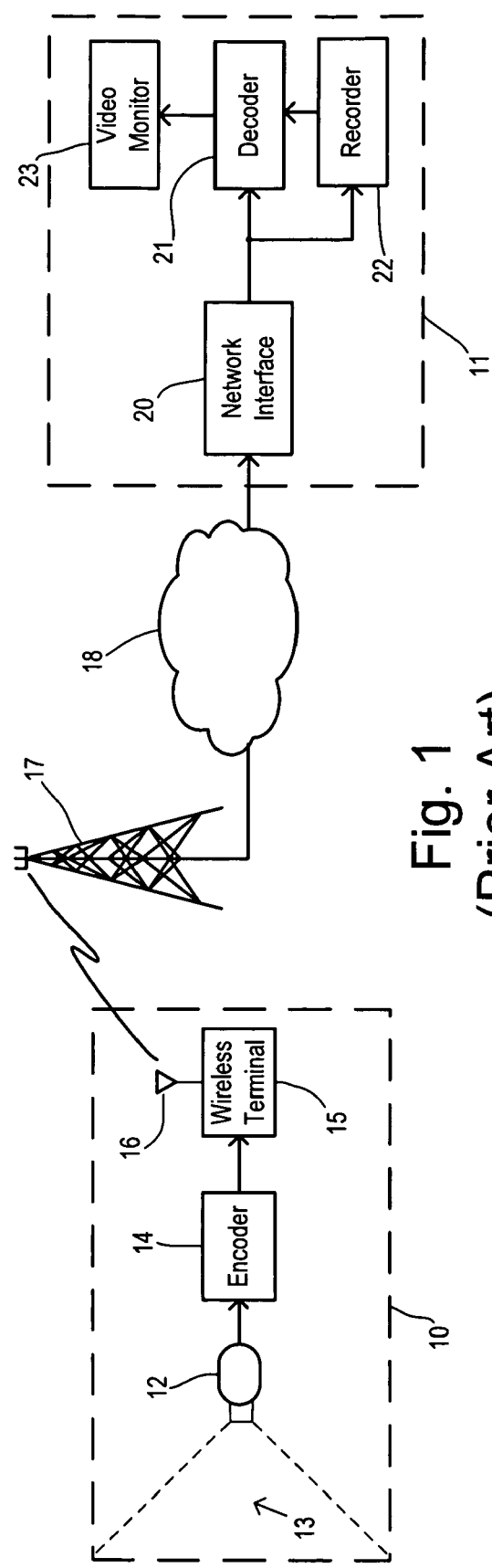
FIG. 1 is a block diagram showing a conventional video surveillance system.

Referring to FIG. 1, a conventional system is shown for streaming surveillance video from a surveillance location 10 to a monitoring location 11. Such a system may be used as part of a security system for a bank or a store, for example. A camera 12 collects video images within a field of view 13 and provides resulting video signals to an encoder 14. Encoder 14 compresses and packetizes the video data, preferably compliant with a multimedia protocol such as RTP. The resulting packets are streamed by a wireless terminal 15 from an antenna 16 to a base station 17 in a wireless network 18 (e.g., a wireless cellular data network). Network 18 preferably includes an Internet Protocol (IP) network for conveying digital data. The packets are delivered by network 18 to a network interface 20 at monitoring location 11. The received RTP packets are sent in parallel to a decoder 21 and a recorder 22. Decoder 21 performs complementary functions to those of encoder 14 in order to generate a video signal that is provided to a video monitor 23. Recorder 22 preferably stores the multimedia content in RTP (i.e., packetized) format so that when it is desired to view a portion of the stored video, such portion is sent to decoder 21 for unpackaging and decompression prior to reproduction on video monitor 23.

Figure 2:
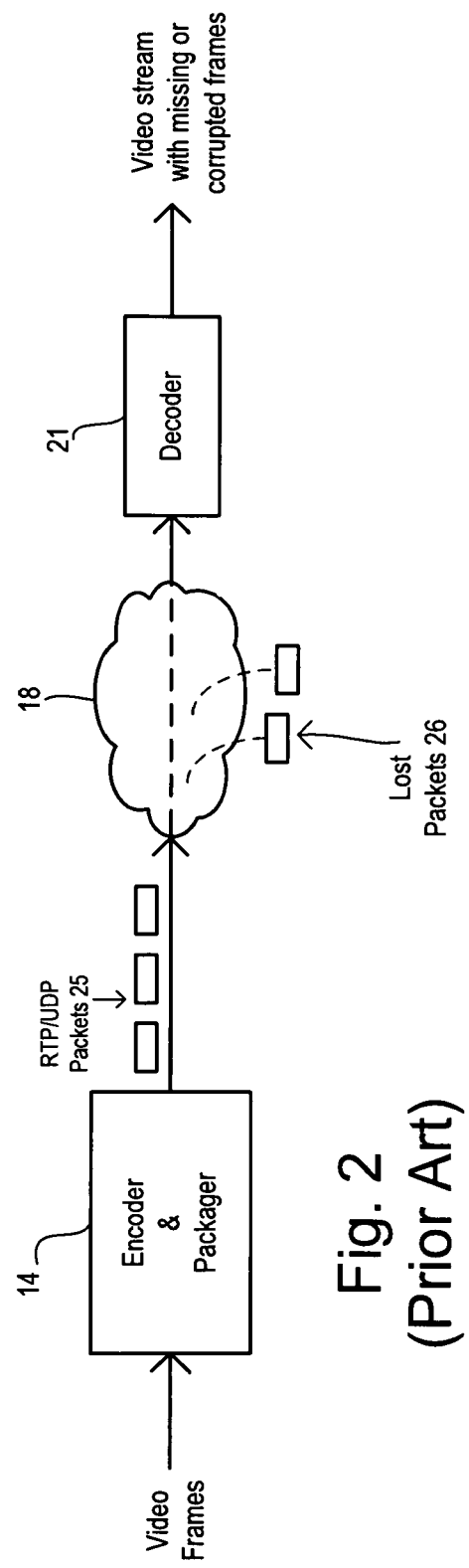
FIG. 2 is a block diagram showing packet loss in a conventional system.

FIG. 2 illustrates further aspects of the video signal transmission. A plurality of video frames are provided to encoder and packager 14 which outputs a plurality of RTP/UDP packets 25. Each individual packet may include exactly one frame of video or it may include more or less than one video frame.

Since UDP is used as the transport mechanism, as packets pass through the wireless link and/or network 18, certain ones of the RTP packets may be lost or corrupted. These are shown as lost packets 26. Decoder 21 receives the remaining packets which are not lost, and it recreates a video stream that will exhibit degraded quality if there are missing or corrupted frames. Conventionally, both the live video display and the recorded video utilize the video stream with identical missing or corrupted frames.

A first embodiment of the present invention with specialized use of retransmitted packets is shown in FIG. 3. Equipment at a surveillance location 25 is coupled to equipment at a monitoring location 26 over an intervening IP network 27 which may include both wireless and landline network segments, for example. A camera 30 at surveillance location 25 provides a video signal to encoder and packager 31. Original packets for an original packet stream are provided to a transmit controller 32. The original packets are also provided to a buffer 33 which stores all new packets and discards the oldest stored data after becoming full as new data arrives. Each buffered packet is identified by an original sequence number, and the packets can be individually accessed according to their sequence number for as long as they reside in buffer 33. A stream of original packets traverses network 27 from transmit controller 32 to a receive controller 34 at monitoring location 26. The original packets are sent by receive controller 34 to both a decoder 35 and a recorder 36. A live video signal is generated by decoder 35 and provided to a monitor 37 so that it may be viewed by personnel at the monitoring location in real time.

The original packets may preferably be stored in the order of their sequence numbers by recorder 36. When a sequence number is missing for longer than a time identified by a loss criteria, then receive controller 34 sends a request over network 27 to transmit controller 32 requesting retransmission of the missing packet. Transmit controller 32 accesses the desired packet from buffer 33 and resends it to receive controller 34 as part of a retransmission stream over network 27. Receive controller 34 sends the retransmitted packets to recorder 36 for insertion in the correct position. Thus, when video is to be viewed from recorder 36, a high quality stream is provided from recorder 36 to decoder 35 and the resulting reproduced video signal on monitor 37 is of potentially higher quality than the earlier live reproduction because the loss criteria can request retransmission of lost packets even after it is too late for a retransmitted packet to be used by the decoder for live reproduction.

Preferably the packets generated by encoder and packager 31 are compliance with the RTP protocol as defined in RFC3550 of the network working group. In order to support requests for retransmission, extensions to the RTP protocol as defined in RFC4585 and RFC4588 are preferably used.

A packet within the original packet stream is preferably compliant with an RTP format as shown in FIG. 4. A header includes a payload type, a sequence number, a time stamp, and a synchronization source (SSRC). The sequence number preferably has a value one greater than the previous packet (i.e., monotonically increasing) in the original packet stream (the stream beginning with a randomly selected sequence number for the first packet). The time stamp identifies an actual clock time for when the video frame was received from the camera. The SSRC value has a fixed value assigned at the time that the networking session is established and remains fixed throughout the session. Following the header, payload data defining the multimedia content is provided.

The RTP format preferably used for a retransmitted packet is shown in FIG. 5. The retransmitted packets are preferably contained in a separate identifiable stream from the original packet stream. The header for the retransmitted packet includes a new sequence number assigned for the retransmission stream. It also includes the old time stamp from the original packet being transmitted. The header further includes an SSRC value which may be the same as the original packet stream's SSRC value or may be a separately assigned value depending on the multiplex method used to transmit the two packet streams. More specifically, either session multiplexing or SSRC multiplexing can be used as defined in RFC 4588. In SSRC multiplexing, both streams are transmitted within the same networking session. Therefore, a separate, unique value is assigned to the SSRC for the retransmitted packets. Alternatively, session multiplexing may be used wherein a separate network session is established for the retransmission stream. In order to associate the two streams, the same SSRC value is used for both the retransmitted packet stream and the original packet stream. The retransmitted packet in FIG. 5 further includes the original sequence number following the header and then the original payload data, thereby allowing the receive controller to recreate the original lost packet for storage by the recorder.

Figure 6:
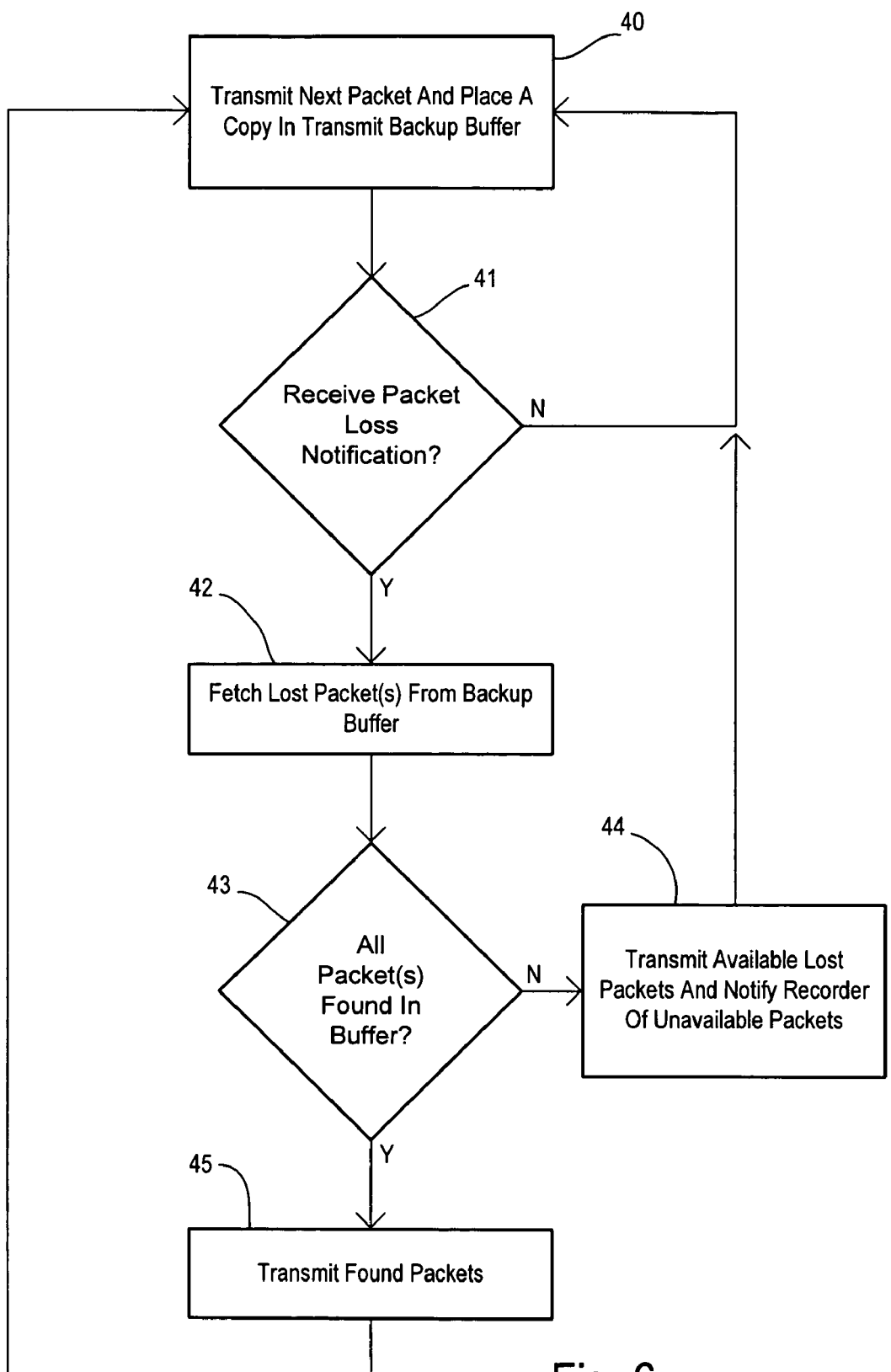
FIG. 6 is a flowchart showing an embodiment of the invention for transmitting original and retransmitted packets.

FIG. 6 shows a preferred method for operating the transmit controller. In step 40, the next original packet is transmitted onto the network and a copy of the original packet is placed in the transmit backup buffer. A check is made in step 41 to determine whether a packet loss notification has been received from the receiver. If not, then a return is made to step 40 for handling the next original packet. If a packet loss notification was received, then any requested packets are fetched from the backup buffer in step 42. A check is made in step 43 to determine whether all requested packets are found in the buffer. If not, then the available packets are transmitted in step 44 and a message is sent to notify the recorder of the unavailable packets. If all packets were found in the buffer, then they are all transmitted in step 45. In either case, a return is made to step 40 for transmitting the next original packet when it becomes available.

Figure 7:
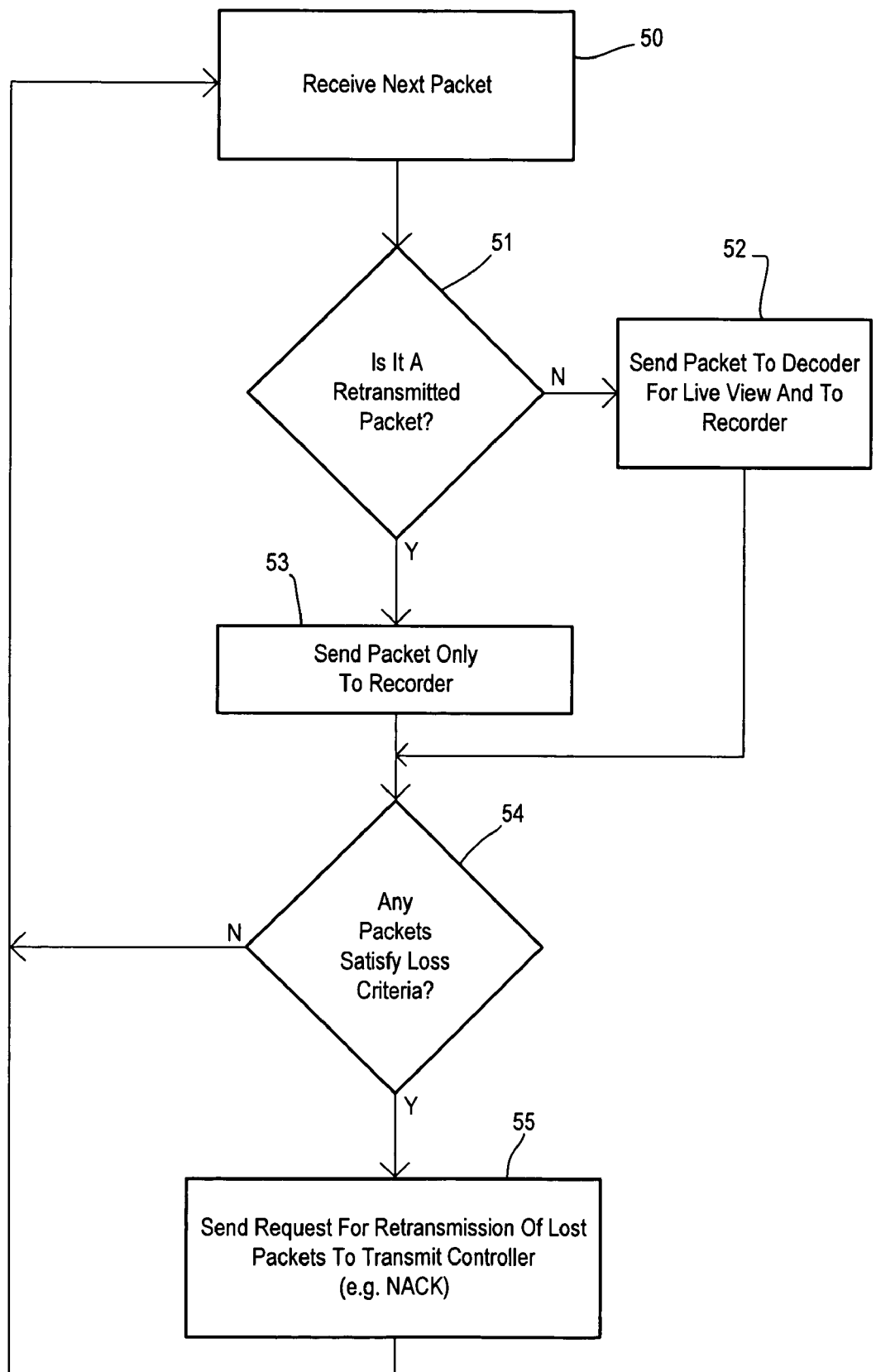
FIG. 7 is a flowchart showing an embodiment of the invention for receiving and processing packets and detecting lost packets.

A preferred method for operating the receive controller is shown in FIG. 7. A packet is received in step 50. A check is made in step 51 to determine whether the received packet is a retransmitted packet (e.g., in response to the SSRC value or the session that included the packet). If not a retransmitted packet, then the packet is part of the original stream and it is sent to the decoder for live viewing and to the recorder for storing. When it is a retransmitted packet, it is sent only to the recorder in step 53.

A check is made in step 54 to determine whether any expected packets satisfy the loss criteria. RTP packets in the original stream have respective sequence numbers that are monotonically increasing. In one embodiment, the loss criteria may comprise detecting that an expected packet having an expected sequence number following the sequence number of an already received packet has not been received but that a subsequent packet number has been received having a sequence number greater than the expected sequence number by a predetermined threshold. In other words, if a packet with a sequence number of 100 has been received and is stored in the recorder, but a packet numbered 101 has not been received even though a packet with a sequence number 1,001 has been received, then packet 101 is overdue by about the time corresponding to 900 packets. If the predetermined threshold is set at 900, then the loss criteria is satisfied and a request for retransmission of packet 101 is sent in step 55 to the transmit controller. In a preferred embodiment, the retransmission request may be comprised of a negative acknowledgement (NACK) as defined in RFC 4588.

The loss criteria utilized in the present invention should preferably be consistent with the size of the retransmit buffer in the transmit device, but it can involve a delay much greater than what would otherwise be required in order to correct the video being decoded for live reproduction. In other words, the predetermined threshold for identifying a lost packet can be much greater than the number of milliseconds that would be required in order to correct live video frames before they are displayed. Instead, a threshold of many seconds or even minutes can be employed provided that the transmit backup buffer maintains the packets for a corresponding amount of time.

What is claimed is:

1. A video surveillance system comprising:
   a camera generating a video signal at a surveillance location;
   an encoder receiving the video signal and generating real-time sequenced packets corresponding to the video signal;
   a transmit buffer coupled to the encoder for buffering the sequenced packets;
   a transmit controller coupled to the encoder and the transmit buffer, wherein the transmit controller transmits an original packet stream comprising the sequenced packets, and wherein the transmit controller is responsive to retransmission requests to transmit sequenced packets from the transmit buffer as a retransmission stream;
   a receive controller at a monitoring location for receiving the original packet stream, wherein the receive controller detects missing packets from the original packet stream and transmits corresponding retransmission requests to the transmit controller for the missing packets;
   a packet-based network coupling the transmit and receive controllers;
   a decoder responsive to the original packet stream to generate a reproduced video signal for viewing at the monitoring location; and
   a recorder for storing recorded video responsive to the original packet stream and the retransmission stream;
   wherein the retransmission stream includes sequenced packets that are received too late to be used by the decoder for live reproduction, so that the recorded video provides a higher quality reproduced video signal than the reproduced video signal viewed in real-time at the monitoring location; and
   wherein the receive controller detects missing packets according to a loss criteria, wherein the real-time sequenced packets each include a respective sequence number monotonically increasing, and wherein the loss criteria comprises detecting that an expected packet having an expected sequence number following the sequence number of an already received packet has not been received but a subsequent packet has been received having a sequence number greater than the expected sequence number by a predetermined threshold.

2. The system of claim 1 wherein the recorder is coupled to the decoder for replaying the recorded video.

3. The system of claim 1 wherein the packet based network is comprised of a wireless cellular data network.

4. The system of claim 1 wherein the sequenced packets in the original packet stream and the retransmission stream are comprised of real time protocol (RTP) packets.

5. The system of claim 4 wherein the retransmission requests are comprised of negative acknowledgement (NACK) messages.

6. The system of claim 4 wherein the original packet stream and the retransmission stream are sent within the same RTP session using respective synchronization source (SSRC) identifiers.

7. The system of claim 4 wherein the original packet stream and the retransmission stream are sent within different RTP sessions using an identical synchronization source (SSRC) identifier.

8. A method of providing video surveillance of a surveillance location from a monitoring location, comprising the steps of:
   generating a video signal from a camera at the surveillance location;
   encoding the video signal into real-time sequenced packets;
   buffering the sequenced packets in a transmit buffer;
   transmitting an original packet stream comprising the sequenced packets from the surveillance location to the monitoring location via a packet-based network;
   receiving the original packet stream at the monitoring location and applying a loss criteria to detect when there are missing packets from the original packet stream;
   when a missing packet is detected, then transmitting a corresponding retransmission request to the surveillance location;
   decoding the original packet stream to generate a reproduced video signal for viewing at the monitoring location; and
   recording the original packet stream supplemented by the retransmission stream;
   wherein the retransmission stream includes sequenced packets that are received too late to be used by the decoder for live reproduction, so that the recorded video provides a higher quality reproduced video signal than the reproduced video signal viewed in real-time at the monitoring location, wherein the real-time sequenced packets each include a respective sequence number monotonically increasing, and wherein the loss criteria comprises detecting that an expected packet having an expected sequence number following the sequence number of an already received packet has not been received but a subsequent packet has been received having a sequence number greater than the expected sequence number by a predetermined threshold.

9. The method of claim 8 wherein the packet based network is comprised of a wireless cellular data network.

10. The method of claim 8 wherein the sequenced packets in the original packet stream and the retransmission stream are comprised of real time protocol (RTP) packets.

11. The method of claim 10 wherein the retransmission requests are comprised of negative acknowledgement (NACK) messages.

12. The method of claim 10 wherein the original packet stream and the retransmission stream are sent within the same RTP session using respective synchronization source (SSRC) identifiers.

13. The method of claim 10 wherein the original packet stream and the retransmission stream are sent within different RTP sessions using an identical synchronization source (SSRC) identifier.

* * * * *